No. 658,851. Patented Oct. 2, 1900.
F. E. KEYES.
APPARATUS FOR MAKING PAILS FROM PULP.
(Application filed June 26, 1899.)
(No Model.) 3 Sheets—Sheet 1.
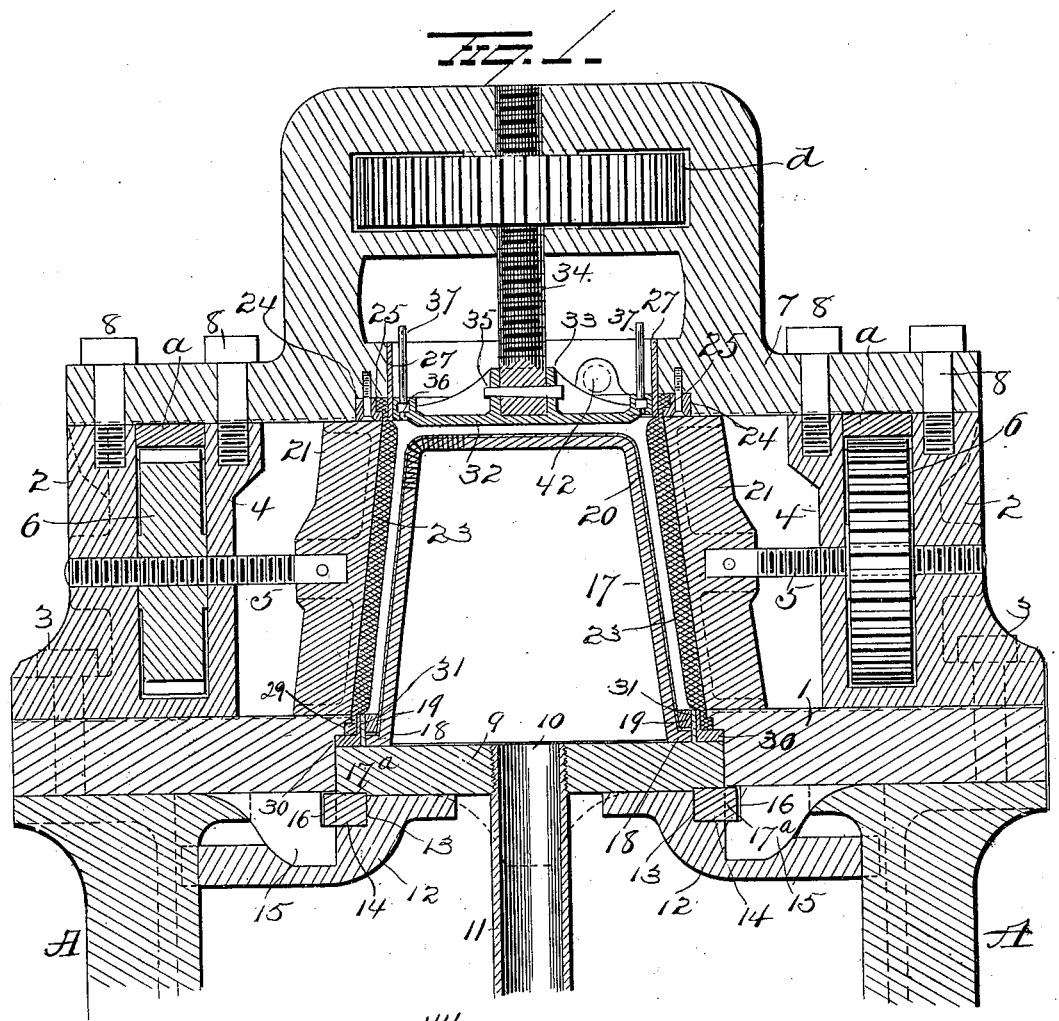
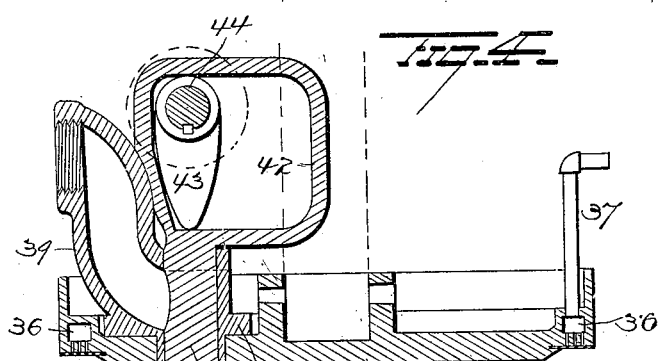
WITNESSES
E. D. Nottingham
G. F. Downing
INVENTOR
F. E. Keyes
By H. A. Seymour
Attorney
THE NORRIS PETERS CO., PHOTO-LITHO., WASHINGTON, D. C.

No. 658,851. Patented Oct. 2, 1900.
F. E. KEYES.
APPARATUS FOR MAKING PAILS FROM PULP.
(Application filed June 26, 1899.)

(No Model.) 3 Sheets—Sheet 2.

WITNESSES
INVENTOR
F. E. Keyes
By H. A. Seymour
Attorney

No. 658,851. Patented Oct. 2, 1900.
F. E. KEYES.
APPARATUS FOR MAKING PAILS FROM PULP.
(Application filed June 26, 1899.)
(No Model.) 3 Sheets—Sheet 3.

WITNESSES
E. J. Nottingham
G. F. Downing

INVENTOR
F. E. Keyes
By H. A. Seymour
Attorney

UNITED STATES PATENT OFFICE.

FRANK EUGENE KEYES, OF NEW YORK, N. Y., ASSIGNOR OF ONE-HALF TO CHARLES R. SMITH, OF MENASHA, WISCONSIN.

APPARATUS FOR MAKING PAILS FROM PULP.

SPECIFICATION forming part of Letters Patent No. 658,851, dated October 2, 1900.

Application filed June 26, 1899. Serial No. 721,932. (No model.)

*To all whom it may concern:*

Be it known that I, FRANK EUGENE KEYES, a resident of New York city, in the county of New York and State of New York, have invented certain new and useful Improvements in Apparatus for Making Pails from Pulp; and I do hereby declare the following to be a full, clear, and exact description of the invention, such as will enable others skilled in the art to which it appertains to make and use the same.

My invention relates to an improvement in an apparatus for making pails from pulp, one object of the invention being to provide an apparatus of the above-mentioned character which will when in operation form a perfect pail in a short space of time.

A further object is to provide an apparatus for making articles of pulp, by means of which a pail or other article can be constructed with walls having the same thickness throughout and every part of which shall be subjected to the same degree of pressure.

A further object is to provide a pail-making machine which will be extremely simple in construction, cheap to manufacture, easy to operate, and most effectually perform the functions for which it is intended.

With these objects in view the invention consists in certain novel features of construction and combinations and arrangements of parts, as will be more fully hereinafter described, and pointed out in the claims.

Figure 2:
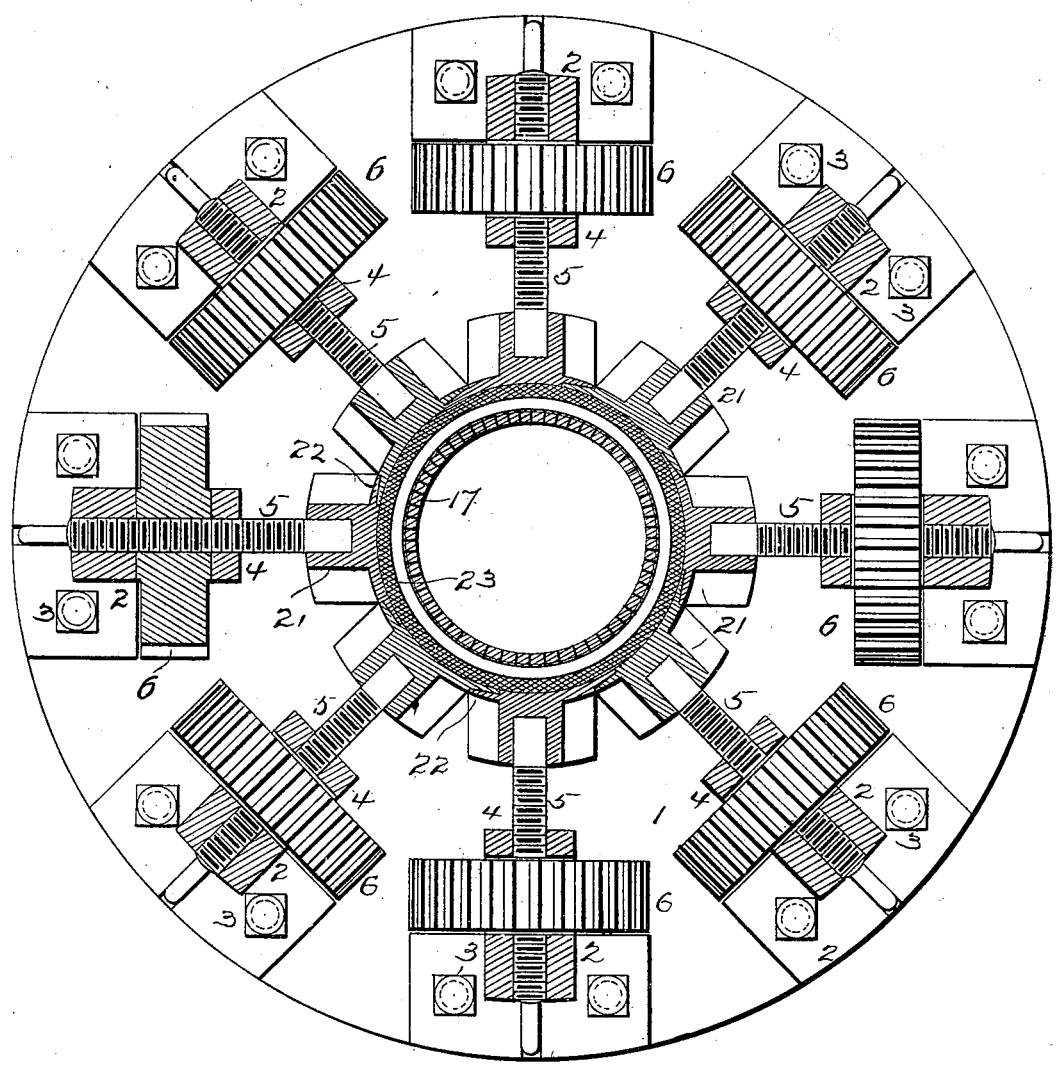
Figure 3:
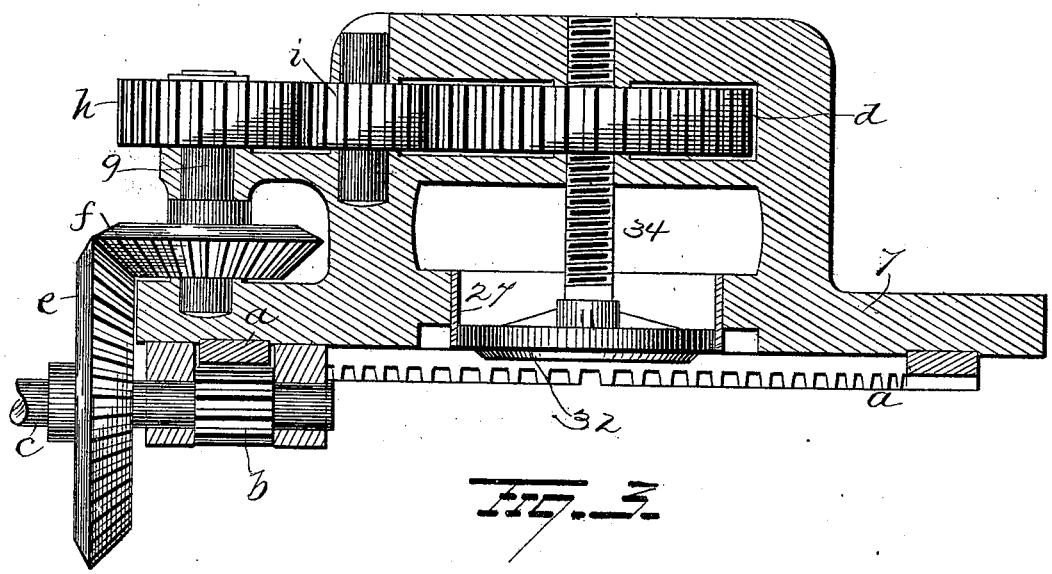
Figure 5:
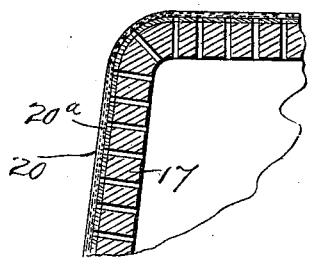

In the accompanying drawings, Figure 1 is a view in section illustrating my improvements. Fig. 2 is a plan view with the top removed, and Figs. 3, 4, and 5 are sectional views of details of construction.

A represents a series of uprights or supports, on the upper ends of which a ring 1 is secured. A series of brackets 2 are spaced apart and secured on the ring 1 by means of pins or bolts 3. The brackets 2 comprise parallel uprights 4 4, having alined holes or openings for the free passage of threaded rods 5. A gear-wheel 6, having a central screw-threaded hole, is mounted on each rod 5 between the upright sections 4, and a cap or cover 7 is secured on the brackets 2 by means of bolts or pins 8. An annular rack $a$ is disposed over the gears 6 so as to turn them all simultaneously. A gear-wheel $b$ meshes with the rack $a$ and is carried by a shaft $c$, to which motion is imparted from any convenient source of power.

A circular base 9 is disposed in the ring 1 and is provided with a central opening 10, which communicates with a tube or pipe 11 for draining the water from the pulp, as will be more fully hereinafter explained. The base 9 is provided on its lower face with outwardly-projecting arms 12, the free ends of which are adapted to move in guides in the uprights A. Each arm 12 is provided with a recess 13 for the reception of a ring 14. A series of blocks 15 depend from the ring 1 and are provided with recesses 16 for the accommodation of the ring 14, and the latter is made with recesses $17^a$ to permit the base 9 to pass the blocks 15, and it will be seen that when the base 9 is in its highest position the ring 14 can be turned to throw the recesses $17^a$ out of alinement with the blocks 15, and hence lock the base in place. A grooved and perforated mold 17 is secured on the top of the base 9. The mold 17 is just the shape of the inside contour of the pail to be made and is provided around its lower edge with a peripheral flange 18, on which a ring 19 is disposed. The ring 19 is adapted to secure a covering 20, of canvas or other fabric, over the mold, and said mold is perforated throughout its entire body for the escape of moisture, as will be more fully hereinafter explained. A perforated metal shell $20^a$ is disposed between the mold and the canvas covering 20.

A plunger 21, made concave on its inner face, is secured to the end of each rod 5. The plungers 21 are made with overlapping sides, as shown at 22, and said plungers are adapted to bear against a flexible band 23, of heavy sheet-rubber, secured at its upper edge to the top or cap by means of a ring 24, having a groove 25 therein to receive the upper edge of the band 23, and a sleeve 27 is secured in the cap and is disposed against the band 23 at its upper edge and assists in holding said band in place. The lower edge of the band 23 is held in a groove 29 in the ring 1 by means of a ring 30, having a flange 31 thereon to inclose the lower edge of said band.

A chime-plate 32 is movably mounted in the sleeve 27 and is provided centrally on its upper face with a socketed enlargement 33, in which a screw-threaded rod 34 is secured by means of a pin 35, passing through holes in the enlargement and rod, as shown. A gear-wheel $d$ is disposed in the cap and mounted on the rod 34, said gear-wheel being connected with the shaft $c$ and adapted to be turned thereby.

The shaft $c$ is provided with a bevel-gear $e$, which meshes with a bevel-gear $f$, secured on a vertical shaft $g$. The shaft $g$ has also secured thereon a gear-wheel $h$, which meshes with an idle gear $i$, and the latter transmits motion to the gear $d$, as clearly shown in Fig. 3, so that the shaft $c$ is adapted when turned to transmit motion through the gearing heretofore described to simultaneously operate the staves and chime-plate.

The chime-plate 32 is provided around its edge with a chamber 36, the bottom of which is perforated to permit the moisture pressed from the pulp to enter said chamber 36. Drain-pipes 37 communicate with the chamber 36 and are adapted to carry off the moisture from said chamber.

The chime-plate 32 is provided with a hole or opening 38, and a pulp-inlet pipe 39 communicates with said opening and is provided with a peripheral flange 40, disposed against the top of the chime-plate. A plug or valve 41 is disposed in the pipe 39 and is adapted to close the opening 38 to prevent the passage of pulp into the machine. The plug or valve 41 is made on its upper end with a rectangular casing 42, which projects laterally therefrom, and within said casing a cam 43 is disposed. The cam 43 is secured on the end of a shaft 44, and said shaft is provided with a suitable means (not shown) for turning the same to raise and lower the valve or plug 41.

The operation of my improved apparatus is as follows: When a pail is to be formed, the valve 41 is raised and the proper amount of pulp permitted to flow through the chime-plate into the space surrounding the mold, when the valve 41 will be closed. The rack $a$ is now operated to turn the gears 6 and $d$ to press the plungers 21 inward against the rubber band 23. The gear $d$ forces the chime-plate downward, and said chime-plate and plungers press the pulp into shape around the mold, the moisture escaping through the perforations in the mold and the pipe 11. When the pulp has been sufficiently pressed, the ring 14 is turned so as to bring the recessses therein in alinement with the blocks 15 and the plungers are withdrawn partially and the base-plate 9 lowered. When the base-plate and mold are free from the main portion of the apparatus, the molded pail can be readily removed and the parts moved to their former position and the operation repeated.

By the use of the heavy rubber band the pressure will be uniform throughout the walls of the pail, the pulp composing the walls of the pail will have a uniform density and thickness in every part, so that the waterproofing material to which the pail will be treated will penetrate the walls to the same depth throughout, and no stave marks or ridges will appear on the pail, as is the case with pails manufactured in machines as heretofore constructed.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In an apparatus for making pails from pulp, the combination with a perforated mold, of a flexible band around said mold and spaced therefrom, plungers or staves adapted to press said flexible band toward said mold and a chime-plate adapted to be pressed toward the end of said mold.

2 In an apparatus for making pails, the combination with a perforated mold, of a fabric covering for said mold, a flexible band around the mold and spaced therefrom and plungers or staves adapted to press said flexible band toward the mold.

3. In an apparatus for making pails from pulp, the combination with a ring and a movable base, of a perforated mold on said base, a movable notched ring carried by the movable base, recessed arms on the fixed ring for the reception of said movable ring for locking said base in its highest position, a flexible band around said mold when the latter is in its highest position, means for pressing said flexible band toward the mold, a chime-plate and means for pressing said chime-plate down toward the top of the mold.

In testimony whereof I have signed this specification in the presence of two subscribing witnesses.

FRANK EUGENE KEYES.

Witnesses:
H. D. JAMESON,
A. NUTTING.